United States Patent [19]

Harding, Jr.

[11] Patent Number: 4,982,100

[45] Date of Patent: Jan. 1, 1991

[54] METHOD AND APPARATUS FOR REPELLING INSECTS

[76] Inventor: Norman T. Harding, Jr., P.O. Box 91233, Pittsburgh, Pa. 15221

[21] Appl. No.: 908,711

[22] Filed: Sep. 18, 1986

Related U.S. Application Data

[63] Continuation-in-part of Ser. No. 745,357, Jun. 14, 1983.

[51] Int. Cl.⁵ .............................................. H01K 7/00
[52] U.S. Cl. .............................. 250/504 R; 250/493.1
[58] Field of Search .............................. 250/504, 493.1

[56] References Cited

U.S. PATENT DOCUMENTS 1,684,081 9/1928 Akers .............................. 250/504 R

OTHER PUBLICATIONS

Callahan, Agricultural Research Service Project, No. 6615-20250-024-00D.
Applied Optics, Apr. 15, 1985, vol. 24, No. 8, pp. 1088-1093 article entitled "Mechanism of Attraction of the Lovebug, *Plecia nearctica*, to Southern Highways: Further Evidence for the IR-Dielectric Waveguide Theory of Insect Olfaction", by Philip S. Callahan, Thelma C. Carlysle and Harold A. Denmark.
Applied Optics, Apr. 15, 1985, vol. 24, No. 8, pp. 1094-1099, article entitled, "Dielectric Waveguide Modeling at 3.0 cm of the Antenna Sensilla of the Lovebug, *Plecia neartica* Hardy", by Philip S. Callahan.

*Primary Examiner*—Jack I. Berman
*Attorney, Agent, or Firm*—Buchanan Ingersoll; Lynn J. Alstadt; Barry I. Friedman

[57] ABSTRACT

The specification discloses an apparatus and method for repelling insects through the generation of only far infrared electro-magnetic waves in the range 50 microns to 1000 microns in length.

3 Claims, 1 Drawing Sheet

U.S. Patent   Jan. 1, 1991   4,982,100
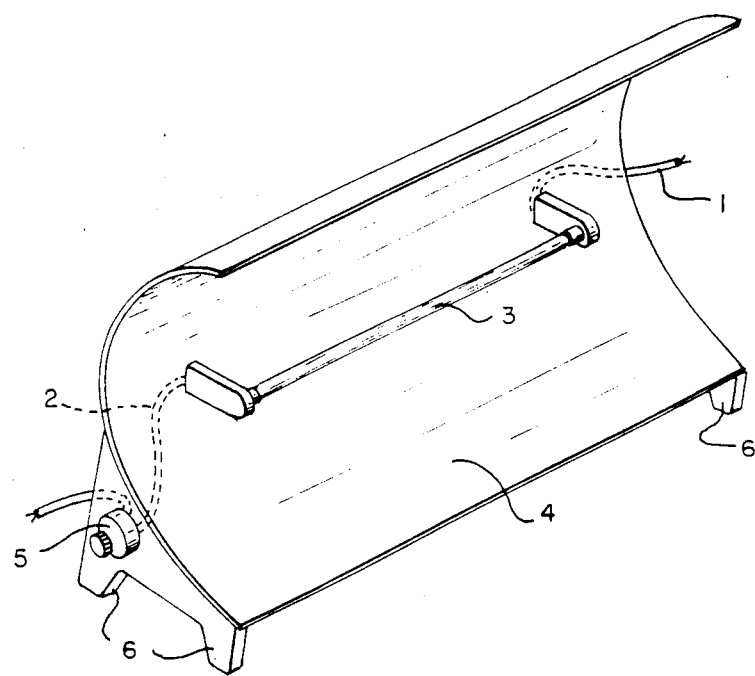

METHOD AND APPARATUS FOR REPELLING INSECTS

CROSS REFERENCE TO RELATED APPLICATION

This application is a continuation-in-part of my co-pending application Ser. No. 745,357, filed June 14, 1985.

FIELD OF INVENTION

The present invention relates to a method and electrical transmitter device for repelling insects by transmitting infrared electro-magnetic waves between 50 microns and 1000 microns.

DESCRIPTION OF THE PRIOR ART

The art has made numerous attempts to keep pests away from homes, food storage bins and other areas. Much work has been done in developing electrical devices for attracting mosquitoes and other insects into traps. If the pests can be lured to the trap, the area sought to be protected will be free of the pests.

Much of the work relating to electrical devices has been in the development of transmitters which attract insects. Phillip S. Callahan for example, has reported work in the Apr. 15, 1985 issue of "Applied Optics" which established that certain spectra of light will attract lovebugs. Apparently, certain wave lengths of electromagnetic radiation in the infrared or near infrared range affect the olfactory receptors of the insect antenna causing the insects to migrate toward the transmitter.

Transmitters have not been used to repel insects. Until the present invention, it was not known that certain wave lengths had a repellent effect on insects responsive to scent. Yet, there is a need for a device which will repell insects from a transmitter. Such a device could replace various types of insect repellents for general home and agriculture use.

SUMMARY OF THE INVENTION

The present invention relates to an apparatus and method for repelling insects through the transmission of only far infrared electromagnetic waves between 50 microns and 1000 microns in length. I have found that wave lengths of this type are useful in repelling insects responsive to scent. Wave lengths in this range mimic the molecular vibrations of various aromatic oil molecules which are known to have repellent properties. For instance, eucalyptus oil which has a repellent effect on some species of mosquitoes measures from the far end of the infrared region at approximately $10^{-9}$ cycles per second. This frequency, duplicated with constant intensity, neutralizes and distorts the mosquitoes antenna reception. Repellent frequencies can be duplicated to repel any insect that is responsive to scents.

On the other hand, I have conducted experiments using numerous light and heat devices which emit far infrared waves as well as other portions of the infrared spectrum. My results show that the presence of near infrared wavelengths defeats the insect repelling capabilities of the far infrared electromagnetic waves.

BRIEF DESCRIPTION OF THE DRAWING

The Figure is an isometric view of the present preferred embodiment of my transmitter.

DESCRIPTION OF THE PREFERRED EMBODIMENTS

Referring to the Figure, I provide a reflector comprised of aluminum metal film (4) mounted on appropriate sized legs 6. The reflector is preferably curved to reflect waves transmitted by a glow bar 3 mounted at the center of the reflector. Electrodes 1 and 2 are provided at either end of the glow bar which connected through a potentiometer 5 to a suitable power source (not shown). I have found that with a glow bar transmitter a voltage of 13 volts with an amperage of between 10.55 to 14.25 will generate wave lengths only within the 50 to 1000 micron range.

It should be apparent to those skilled in the art that other transmitters may be used for transmitting frequencies within the desired range. However, I prefer to use a glow bar because that device provides less frequency variation over time.

While I have described and shown a present preferred embodiment of my method and apparatus, it should be distinctly understood that the invention is not limited thereto but may be variously embodied within the scope of the following claims.

I claim:

1. A method for repelling insects comprising the step of passing an electrical current through an element so as to generate only far infra-red electro-magnetic waves, said waves being between 50 microns and 1000 microns in length.

2. An apparatus for repelling insects comprising:
   (a) means for emitting only far infrared electromagnetic waves between 50 microns and 1000 microns in length;
   (b) reflector means attached to said generator means for focusing the electromagnetic waves in a desired direction; and
   (c) support means attached to the reflector for locating the reflector and attached emitter at a desirable position.

3. The apparatus of claim 2 wherein the emitter is comprised of a glow bar, potentiometer and voltage source connected in series.